United States Patent Office 2,841,556
Patented July 1, 1958

2,841,556

PROCESS FOR PREPARING ANHYDROUS
LIME GREASE

Reuben A. Swenson, Hammond, and Stephen J. Zajac,
Whiting, Ind., assignors to Standard Oil Company,
Chicago, Ill., a corporation of Indiana No Drawing. Application December 19, 1955
Serial No. 554,102

11 Claims. (Cl. 252—39)

This invention relates to improvements in the manufacture of greases and more particularly relates to the preparation of substantially anhydrous calcium hydroxy stearate greases.

Calcium soap greases, commonly referred to as cup greases, prepared with calcium stearate or the calcium soap of other commonly employed high molecular weight fatty acids, are unstable and in order to prevent the separation of the calcium soap from the grease product, are stabilized by incorporating water in an amount up to about 10% of the soap present in the grease. Since water is necessary for maintaining a stable calcium soap grease, such greases cannot normally be used at temperatures above which the water is evaporated from the grease. Due to this characteristic, the use of conventional cup greases has been limited to temperatures below the boiling point of water; and hence, although such greases have drop points in the range of 185° F. to 220° F., their use has been restricted to temperatures below about 175° F.

Recently, calcium soap greases have been prepared with hydroxy fatty acids such as 12-hydroxy stearic acid. Calcium soap greases prepared with 12-hydroxy stearic acid are more stable than the conventional calcium soap greases and can be employed as more relatively high temperatures are encountered. However, the prior art method of preparing calcium soap greases with 12-hydroxy stearic acid requires slow, careful dehydration at temperatures below about 275° F. over a relatively long period of time. One method of preparing such calcium 12-hydroxy stearate greases described in U. S. 2,607,734 issued to L. W. Sproule et al., August 19, 1952, requires about 14 hours for dehydration.

It is an object of the present invention to provide an improved method of preparing a stable calcium soap grease. Another object of the invention is to provide a rapid method of preparing stable greases containing a calcium soap of a high molecular weight hydroxy fatty acid. A still further object of the invention is to provide a rapid method of preparing a stable substantially anhydrous 12-hydroxy stearate grease. Other objects and advantages of the invention will become apparent from the following description thereof.

In accordance with the present invention, stable substantially anhydrous calcium high molecular weight hydroxy fatty acid soap base greases are prepared by saponifying the fatty acid with lime or other suitable basic calcium compounds, preferably in the presence of the oleaginous vehicle, and effecting the desired grease structure by the addition of water at a temperature of 220° F. or higher and subsequently substantially dehydrating the grease base at a temperature of about 250° F. to about 300° F.

Stable substantially anhydrous calcium high molecular weight hydroxy fatty acid soap base greases, preferably anhydrous calcium hydroxy stearate base greases, can be rapidly manufactured in an open kettle by first preparing a slurry of the lime in an oil, adding stoichiometric amounts of a high molecular weight hydroxy fatty acid such as 12-hydroxy stearic acid, and heating the mixture to a temperature within the range of from about 220° F. to 250° F. After the desired temperature is reached, about from 0.1% to 10% of water, preferably 1 to 5%, is added at which time the grease becomes heavy and glossy within about 5 minutes, and heating is continued for an additional 10–20 minutes. The temperature of the mixture is then raised to about 250° F. to about 300° F., and preferably to about 295° F. to 300° F., and from about 0.1% to about 5.0%, preferably 1% to 3%, water is added. Heating of the mixture is then discontinued and the balance of the oil vehicle of the grease is graded in. The grease is finished at a temperature of about 220° F. to 250° F., and if desired, product is milled or homogenized.

Instead of the foregoing open kettle method of preparation, we can employ a pressure kettle method which differs from the open kettle method in that in the former method the water of hydration is added with the original charge, rather than at a temperature of 220° F. to 250° F., and no additional water is added until a batch temperature of 295° F. to 300° F. is reached.

The finished grease composition contains from about 2% to about 20% of the calcium soap of the hydroxy fatty acid, for example, 12-hydroxy stearic acid, and not more than about 0.1% water. If desired, after all of the oil is graded in, and before milling, conventional additives such as anti-oxidants, E. P. agents, corrosion inhibitors, metal deactivators, etc. can be incorporated in the grease product.

In its broadest aspect the high molecular weight hydroxy fatty acid is a fatty acid containing at least 12 carbon atoms and one or more hydroxyl radicals separated from the carboxyl group by at least one carbon atom. The high molecular weight hydroxy fatty acid employed can be a mono-hydroxy fatty acid or a di-hydroxy fatty acid of from about 10 to about 30 carbon atoms, and preferably from about 14 to about 20 carbon atoms; such fatty acids are substantially saturated fatty acids. It is preferred, however, to use 12-hydroxy stearic acid, the hydroxy fatty acid obtained by the hydrogenation of castor oil, or hydrogenated ricinoleic acid. We can also employ hydroxy stearic acids in which the hydroxy groups are in the 9 or 10 carbon position. The calcium soap can be prepared from the hydroxy stearic acid alone or a mixture of fatty acids such as a mixture of 12-hydroxy stearic acid and a conventional high molecular weight fatty acid such as animal fatty acid or hydrogenated tallow fatty acid can be used. Similarly, the calcium hydroxy fatty acid soap, e. g. calcium 12-hydroxy stearate can be used in combination with other alkaline earth soaps of hydroxy fatty acids such as barium 12-hydroxy stearate.

The oleaginous vehicle employed in the grease composition can be a mineral oil in the lubricating oil viscosity range, i. e. from about 50 S. S. U. at 100° F. to about 500 S. S. U. at 210° F. The mineral oil can be a conventionally refined mineral oil or a solvent-extracted mineral oil and can be derived from a distillate fraction or from a residuum such as, for example, a black oil. Synthetic lubricating oils resulting from the polymerization of unsaturated hydrocarbons or other oleaginous compounds within the lubricating oil viscosity range such as aliphatic dicarboxylic acid esters, of the type disclosed in U. S. 2,450,222, the esters of dihydroxy thioethers such as are described in U. S. 2,451,895, silicone polymers, and the polyoxyalkylene monoethers such as are disclosed in U. S. 2,448,664, and other synthetic lubricating oils can be used. Mixtures of mineral oils and such synthetic lubricating oils can also be used as the oleaginous vehicle in the grease composition.

The following examples illustrating the present invention are being used solely for the purpose of setting forth preferred embodiments of the invention and not with the intention of unnecessarily limiting the same.

EXAMPLE I 61 grams of lime are stirred into a smooth slurry in 2 pounds of a solvent-extracted SAE-40 base oil in a steam heated kettle. One pound of 12-hydroxy stearic acid and 2 pounds of oil are then added and the contents of the mixer heated to 250° F. 20 grams of water (1.4%) are then slowly added and the mixture heated to 250° F. for about 5 minutes at which time a heavy glossy base is obtained. After heating at 253° F. for about 10 minutes, an additional 10 grams of water (0.7%) are then added and maintained at this temperature for about 15 minutes at which time heating is discontinued and the balance of the oil, about 5 pounds, graded in. The grease product is finished at 230° F. and then milled.

Examples of grease products prepared essentially as in Example I are given in Table I.

Table I

| Sample No. | 1 | 2 | 3 | 4 | 5 | 6 |
| --- | --- | --- | --- | --- | --- | --- |
| 12-Hydroxy Stearic Acid | 10.0 | 4.5 | 10.0 | 9.05 | 10.0 | 6.1 |
| Hydrogenated Tallow Fatty Acid | | 4.5 | 2.0 | | | |
| Hydrated lime | 1.34 | 1.21 | 1.61 | 0.96 | 1.34 | 0.82 |
| Water Added for Reaction | 0.10 | | 1.3 | 3.0 | 0.44 | 1.7 |
| Barium Hydroxide Monohydrate | | | | 0.64 | | |
| Kittrell Transformer Oil | | | 69.5 | | | |
| Low Cold Test Polar Machine Oil | | | 17.5 | 90.4 | | |
| Solvent Extracted SAE-10 Oil | 89.3 | 90.25 | | | | |
| Summer Black Oil | | | | | | 93.5 |
| Solvent Extracted SAE-50 Oil | | | | | 89.4 | |
| Percent Soap | 10.6 | 9.5 | 12.7 | 9.6 | 10.6 | 6.5 |
| SSU at 100° F. of Oil | 165 | 165 | 62 | 105 | 1,410 | 500 |
| Unworked Penetration | 263 | 369 | | 310 | 267 | 364 |
| Worked Penetration | 264 | 369 | 230 | 306 | 257 | 360 |
| 100,000 Stroke Penetration | | | | | 283 | |
| Drop Point, ° F.[1] | 278 | | | 291 | 274 | |
| 4 Hour Shell Roll Stability: Penetration Increase [2] | | | | | 2 | |
| Wheel Bearing Test [3] | | | | | Very Good | |
| Leakage—24 hours at 210 [4] | | | | | None | |
| Titration | | | | | 0.5 Acid | |
| Water Content, A. S. T. M. D95-46 | | | | | None | |

[1] A. S. T. M. Method D-566-42.
[2] Test described in Institute Spokesman 6 12 (1943), pp. 1, 4-5.
[3] A. S. T. M. Method D-1263-53T.
[4] VV-L-791 Method 32.1.1.

Sample Nos. 2 and 3 demonstrate the use of other high molecular weight fatty acids in conjunction with 12-hydroxy stearate acid. The ratio of hydrogenated fatty acid to 12-hydroxy stearic acid is 1 to 1 in sample 2 and 1 to 5 in sample 3.

Sample No. 4 demonstrates the use of a mixed soap base. In this case the drop point was raised about 15° F. by employing a mixed soap consisting of 4 parts of calcium 12-hydroxy stearate and 1 part barium 12-hydroxy stearate.

The preparation of a stable substantially anhydrous calcium 12-hydroxy stearate grease using elevated temperatures in the range of about 290° F. to 300° F. is illustrated by the following examples:

EXAMPLE II 52 grams of lime are stirred into a smooth slurry in 2 pounds of a solvent extracted SAE-10 base oil in a steam heated kettle. 385 grams of 12-hydroxy stearic acid are then added and the contents of the mixer heated to 220° F. 50 grams of water (about 4%) are then added and the mixture heated at near 240° F. for about ½ hour. The base is heavy and glossy at this point. 3 pounds additional oil are then graded in. The temperature of the mixture is then raised to 295 to 300° F. and 50 grams water (about 1.5%) is added. The base again becomes very heavy. The heat is turned off and the balance of the oil (about 11.4 pounds) is then added. The oxidation inhibitors are then added. The grease product is then finished at 210 to 250° F., and is then milled.

The grease prepared as above had the following formulation:

| | Lbs. |
| --- | --- |
| 12-hydroxy stearic acid | 4.9 |
| Hydrated lime | 0.65 |
| Phenothiazine | 0.2 |
| Ortholeum 300 [1] | 0.2 |
| Solvent extracted SAE-10 mineral oil | 47.2 |
| Solvent extracted SAE-40 mineral oil | 47.2 |

[1] A mixture of aromatic amines marketed as an anti-oxidant by du Pont.

The grease product of Example II containing 5.2% soap, and less than 0.1% water, had an ASTM penetration at 77° F. of 320 and a drop-point of 290° F. In the bomb test (A. S. T. M. method D942-50) the product had a pressure drop of 4 pounds in 100 hours and a pressure drop of 5 pounds in 500 hours. In the high speed bearing test at 10,000 R. P. M. at 250° F. (CRC test method L-35) the product ran for 1140 hours.

EXAMPLE III

A grease composed of:

| | Lbs. |
| --- | --- |
| 12-hydroxy stearic acid | 500 |
| Hydrated lime | 66 |
| Lead fish oil soap | 300 |
| Sulfurized sperm oil | 100 |
| Chlorinated hydrocarbon [1] | 100 |
| Dodecyl hexasulfide | 10 |
| 300 flash low cold test stock | 2660 |
| Heavy black oil | 6300 |

[1] Alpha Chlor No. 33 marketed by Carlisle Chemical Co.

was prepared as follows: 500 lbs. 12-hydroxy stearic acid, 80 gals. of 300 flash low cold test stock, and 66 lbs. lime are heated in a grease kettle to 240° F. When the base is uniform and well mixed, 50 lbs. water (4.4%) is added. The base is then heated to 295 to 300° F. in about 1 hour and 10 lbs. water (0.9%) is added. The heat is turned off, and the balance of the oil started in by grading within ½ hour. The extreme pressure constituents are added during the grading process at a temperature of about 270° F. Grading is continued, and the batch finished by homogenizing at about 220 to 250° F. The finished product contained less than 0.1% water.

The pressure kettle method of preparation is illustrated by the following example:

EXAMPLE IV

Five pounds of 12-hydroxy stearic acid, 0.66 pound of lime, 1 gallon of 300 flash L. C. T. stock and 0.3 pound of water (2.3%) are charged to a steam-heated pressure kettle, the mixer closed and the contents heated to 220° F. for one-half hour. After 0.5 hour the pressure is released, the mixer opened and the contents heated to 240° F., while adding one-half gallon of 300 flash L. C. T. stock. When the grease base is heavy and substantially dry at 240° F. (as evidenced by the absence of foaming) heating is continued to 295° to 300° F. at which time 0.1 pound (0.6%) water is added. Heating of the mixture is then discontinued and the balance of the oil is graded in. If desired, E. P. agents can be added during the grading-in stage at a temperature of about 270° F. When the grading is completed, the batch is finished by filling through a mill. The finished grease product contains less than 0.1% water.

The herein described methods of preparing stable substantially anhydrous calcium soap greases from hydroxy fatty acids is unique in respect to the addition of water at temperatures of 220° F. to 250° F. and higher to effect the grease structure. When the soap base is substantially dehydrated at 250° F., it is essentially liquid and the addition of small amounts of water at this stage at temperatures of 250° F. to 300° F. causes the base to gel, i. e., form the heavy grease structure.

The preparation of the substantially anhydrous calcium 12-hydroxy fatty acid soap grease by the hereindescribed method does not require a slow careful dehydration of the grease base; in accordance with the present invention substantial dehydration of the grease after the initial hydration can be rapidly effected in less than one hour.

Percentages given herein and in the appended claims are weight percentages unless otherwise indicated.

We claim:

1. The method of preparing a stable substantially anhydrous calcium high molecular weight hydroxy fatty acid soap base grease comprising saponifying a high molecular weight hydroxy fatty acid with a basic calcium compound in contact with from 0.1% to about 10.0% water and a small amount of an oleaginous vehicle, heating said mixture to a temperature of from about 250° F. to about 300° F., to form a heavy soap base, adding from about 0.1% to about 5% of additional water to the heavy soap base at a temperature of about 250° F. to about 300° F., with continuous mixing, discontinuing the heating of said mixture, and grading in additional oleaginous vehicle to obtain a substantially anhydrous grease product.

2. The method of preparing a stable substantially anhydrous calcium high molecular weight hydroxy fatty acid soap base grease comprising, preparing a slurry of lime in a portion of the oleaginous vehicle of the grease, adding to said lime slurry stoichiometric amounts of a high molecular weight hydroxy fatty acid containing at least 12 carbon atoms and at least one hydroxyl radical separated from the carboxyl group by at least one carbon atom, heating said mixture to a temperature of from about 220° F. to about 250° F., adding to said mixture from about 0.1% to about 10.0% of water and maintaining a temperature at about 250° F. for about 10 to 20 minutes to form a heavy glossy soap base, adding from about 0.1% to about 5% of water to the heavy soap base while maintaining a temperature of from about 250° F. to 300° F. for not more than about 15 minutes after the second addition of water, discontinuing the heating of said mixture and grading in the remaining portion of the oleaginous vehicle.

3. The method of claim 2 in which the hydroxy fatty acid is 12-hydroxy stearic acid.

4. The method of claim 2 in which the hydroxy fatty acid is obtained from hydrogenated castor oil.

5. The method of claim 2 in which the oleaginous vehicle is a mineral lubricating oil.

6. The method of preparing a stable substantially anhydrous calcium hydroxy fatty acid soap base grease comprising, preparing a slurry of lime in a portion of the oleaginous vehicle of the grease, adding to said lime slurry stoichiometric amounts of a high molecular weight hydroxy fatty acid, heating said mixture to a temperature of from about 220° F. to about 250° F., adding to said mixture from about 0.1% to about 10% of water and maintaining said temperature at about 250° F. for about 10 to 20 minutes to form a heavy glossy soap base, increasing the temperature of said mixture to about 295° F., adding from about 0.1% to about 5% of water to said heated heavy soap base, discontinuing the heating of said mixture after the addition of said water and grading in the remaining portion of the mineral oil.

7. The method of claim 6 in which the grease product is homogenized.

8. The method of claim 6 in which the hydroxy fatty acid is 12-hydroxy stearic acid.

9. The method of claim 6 in which the hydroxy fatty acid is obtained from hydrogenated castor oil.

10. The method of preparing a stable substantially anhydrous calcium 12-hydroxy stearic acid soap base grease comprising preparing a slurry of lime in a portion of the mineral oil vehicle of the grease, adding to said lime slurry stoichiometric amounts of 12-hydroxy stearic acid, heating said mixture to a temperature of from about 220° F. to about 250° F., adding to said mixture from about 0.1% to about 10% of water and maintaining said temperature at about 250° F. for about 10 to 20 minutes to form a heavy glossy soap base, increasing the temperature of said mixture to about 295° F., slowly adding from about 0.1% to about 5% of water to said heated heavy soap base, discontinuing the heating of said mixture after the addition of said water, grading in the remaining portion of the mineral oil, and milling the grease product.

11. The method of preparing a stable substantially anhydrous calcium high molecular weight hydroxy fatty acid soap base grease, comprising mixing together in a heated pressure kettle lime, stoichiometric amounts of a high molecular weight hydroxy fatty acid containing at least 12 carbon atoms and at least one hydroxyl radical separated from the carboxyl group by at least one carbon atom, a small amount of a lubricating oil, and from about 0.1% to about 10% water, heating said mixture in the closed pressure kettle to a temperature of about 220° F. for about one-half hour, opening said pressure kettle and heating the mixture in the opened pressure kettle to a temperature of about 240° F. to about 250° F., adding additional lubricating oil to said mixture while maintaining a temperature of about 240° F. to about 250° F. until said mixture is substantially anhydrous, raising the temperature of said mixture to about 295° F. to about 300° F., adding from about 0.1% to about 5% water while heating said mixture at a temperature of about 295° F. to 300° F., discontinuing said heating and grading in additional lubricating oil.

References Cited in the file of this patent

UNITED STATES PATENTS 2,607,734    Sproule et al. _____ Aug. 19, 1952

FOREIGN PATENTS 610,190    Great Britain _____ Oct. 13, 1948